(12) United States Patent
Ueki et al.

(10) Patent No.: US 9,023,531 B2
(45) Date of Patent: May 5, 2015

(54) COATED POSITIVE ELECTRODE ACTIVE MATERIAL, POSITIVE ELECTRODE FOR NONAQUEOUS SECONDARY BATTERY, NONAQUEOUS SECONDARY BATTERY, AND THEIR PRODUCTION METHODS

(75) Inventors: Tomoyoshi Ueki, Toyota (JP); Yutaka Oyama, Toyota (JP); Takuichi Arai, Toyota (JP); Kazuhiro Ohkawa, Toyota (JP); Koichi Yokoyama, Toyota (JP); Ryuichi Kuzuo, Niihama (JP); Katsuya Kase, Niihama (JP); Syuhei Oda, Niihama (JP)

(73) Assignees: Toyota Jidosha Kabushiki Kaisha, Toyota-shi, Aichi-ken (JP); Sumitomo Metal Mining Co., Ltd., Tokyo (JP)

( * ) Notice: Subject to any disclaimer, the term of this patent is extended or adjusted under 35 U.S.C. 154(b) by 597 days.

(21) Appl. No.: 12/682,788

(22) PCT Filed: Oct. 17, 2008

(86) PCT No.: PCT/JP2008/068825
§ 371 (c)(1),
(2), (4) Date: Apr. 13, 2010

(87) PCT Pub. No.: WO2009/051212
PCT Pub. Date: Apr. 23, 2009

(65) Prior Publication Data
US 2010/0221613 A1    Sep. 2, 2010

(30) Foreign Application Priority Data

Oct. 18, 2007    (JP) ................................. 2007-271499

(51) Int. Cl.
*H01M 4/58*    (2010.01)
*H01M 4/04*    (2006.01)
(Continued)

(52) U.S. Cl.
CPC .......... *H01M 4/0404* (2013.01); *H01M 4/0471* (2013.01); *H01M 4/131* (2013.01);
(Continued)

(58) Field of Classification Search
CPC ..... H01M 4/049; H01M 4/366; H01M 4/525; H01M 4/5825; H01M 4/0404; H01M 4/0471; H01M 4/131; H01M 4/1391; H01M 4/661; H01M 4/62; H01M 10/0525; H01M 2004/021; Y02E 60/122; Y02T 10/7011
USPC ........ 429/322, 231, 950, 231.4, 231.7, 231.8, 429/231.9, 231.95; 427/126.1
See application file for complete search history.

(56) References Cited

U.S. PATENT DOCUMENTS

| | | | | |
|---|---|---|---|---|
| 5,225,296 A * | 7/1993 | Ohsawa et al. | ............... | 429/213 |
| 5,618,640 A * | 4/1997 | Idota et al. | ................. | 429/218.1 |
| 6,558,844 B2 | 5/2003 | Howard, Jr. et al. | | |
| 2002/0141937 A1 | 10/2002 | Howard, Jr. et al. | | |
| 2005/0227147 A1 * | 10/2005 | Kogetsu et al. | .......... | 429/231.95 |
| 2006/0083989 A1 * | 4/2006 | Suhara et al. | ............... | 429/231.3 |

FOREIGN PATENT DOCUMENTS

| | | |
|---|---|---|
| JP | 7-245105 | 9/1995 |
| JP | 2000-323123 | 11/2000 |

(Continued)

*Primary Examiner* — Milton I Cano
*Assistant Examiner* — Ling R Zeng
(74) *Attorney, Agent, or Firm* — Finnegan, Henderson, Farabow, Garrett & Dunner, LLP

(57) ABSTRACT

Disclosed is a nonaqueous secondary battery (100) comprising a positive electrode (155) having a positive current collector (151) made of a metal, and a positive electrode active material (153) composed of a lithium-metal complex oxide. The surface of the positive electrode active material (153) is coated with a lithium salt (158) having an average thickness of 20-50 nm.

6 Claims, 6 Drawing Sheets

(51) Int. Cl.
*H01M 4/131* (2010.01)
*H01M 4/1391* (2010.01)
*H01M 4/36* (2006.01)
*H01M 4/62* (2006.01)
*H01M 4/66* (2006.01)
*H01M 10/0525* (2010.01)
*H01M 4/02* (2006.01)

(52) U.S. Cl.
CPC ............ *H01M4/1391* (2013.01); *H01M 4/366* (2013.01); *H01M 4/62* (2013.01); *H01M 4/661* (2013.01); *H01M 10/0525* (2013.01); *H01M 2004/021* (2013.01); *Y02E 60/122* (2013.01); *Y02T 10/7011* (2013.01)

(56) References Cited

FOREIGN PATENT DOCUMENTS

| | | |
|---|---|---|
| JP | 2001-60459 | 3/2001 |
| JP | 2002-158010 | 5/2002 |
| JP | 2004-119110 | 4/2004 |
| JP | 2004-214187 | 7/2004 |
| JP | 2004-259675 | 9/2004 |
| JP | 2006-318815 | 11/2006 |
| JP | 2006318815 A * | 11/2006 |
| JP | 2007-103134 | 4/2007 |
| JP | 2007-227310 | 9/2007 |
| WO | WO 02/061865 | 8/2002 |

\* cited by examiner

COATED POSITIVE ELECTRODE ACTIVE MATERIAL, POSITIVE ELECTRODE FOR NONAQUEOUS SECONDARY BATTERY, NONAQUEOUS SECONDARY BATTERY, AND THEIR PRODUCTION METHODS

CROSS-REFERENCE TO RELATED APPLICATIONS

This application is a national phase application of International Application No. PCT/JP2008/068825, filed Oct. 17, 2008, and claims the priority of Japanese Application No. 2007-271499, filed Oct. 18, 2007, the contents of both of which are incorporated herein by reference.

TECHNICAL FIELD

The present invention relates to coated positive electrode active material, positive electrode for nonaqueous secondary battery, nonaqueous secondary battery, and their production methods.

BACKGROUND ART

A nonaqueous secondary battery such as a lithium ion secondary battery has received attention as a power source for a portable device or the like and also a power source for an electric vehicle, a hybrid electric vehicle, etc. In recent years, various positive electrode active materials have been proposed to improve the characteristics of the lithium ion secondary battery (e.g., see Patent Literatures 1 and 2).

CITATION LIST

Patent Literature

Patent Literature 1: JP 2004-119110 A
Patent Literature 2: JP 2004-214187 A

SUMMARY OF INVENTION

Technical Problem

Patent Literature 1 proposes an positive electrode active material in which the surface of each lithium nickel composite oxide particle is coated with a weak acid salt of lithium, the ion concentration of weak acid on the surface of the lithium nickel composite oxide particle is in a range of 0.012 to 0.018 $g^2/Lm^2$. It is described that the use of such positive electrode active material can improve output of the lithium ion secondary battery at low temperature.

Patent Literature 2 proposes a positive electrode active material made of lithium-metal complex oxide expressed by a general formula of $Li_X(Ni_{1-Y}Co_Y)_{1-Z}M_ZO_2$ but has an amount of adhering C measured by a high-frequency burning-infrared absorption method is determined to 0.14 weight % or less. It is described that the use of such positive electrode active material can provide a secondary battery with large capacity and excellent output characteristics at low temperature.

Meanwhile, as a method of producing a positive electrode of a nonaqueous secondary battery, there is a method conducted by coating the surface of a positive current collector (such as aluminum foil) made of metal with positive paste prepared by mixing raw powder materials for positive electrode containing a positive electrode active material with binder resin and water, and then drying the mixture or the like.

However, when the positive electrode is produced by such technique using the positive electrode active material proposed in Patent Literatures 1 and 2, the positive current collector may corrode. This is because mixing the positive electrode active material made of lithium-metal complex oxide and others with water produces LiOH, so that the positive paste becomes strong alkali.

Furthermore, when the alkali is further consumed by corrosion reaction, Li ions in the positive electrode active material are eluted into the positive paste in order to keep chemical equilibrium. The positive current collector therefore continues to corrode. As the corrosion of the positive current collector advances as above, there is a possibility that the current collecting property of the positive electrode greatly lowers and battery output characteristics and others largely decrease. In addition, since Li ions are eluted from the positive electrode active material, causing a decrease in capacity of the positive electrode active material and collapse of the crystal structure of the positive electrode active material, the battery capacity and the output characteristics greatly deteriorate.

The present invention has been made in view of the circumstances and has a purpose to provide a coated positive electrode active material with large capacity and excellent output characteristics, an electrode for nonaqueous secondary battery, a nonaqueous secondary battery, and their production methods.

Solution to Problem

To achieve the above purpose, the invention provides a nonaqueous secondary battery comprising: a positive electrode including: a positive current collector made of metal; and a positive electrode active material made of lithium-metal complex oxide, wherein the positive electrode active material has a surface coated with a lithium salt having an average thickness of 20 to 50 nm. cl 1

The positive electrode of the nonaqueous secondary battery of the invention includes the positive current collector made of metal and the positive electrode active material made of lithium-metal complex oxide.

Such positive electrode is produced, as mentioned above, for example in a manner that a positive paste is prepared by mixing raw powder materials for positive electrode containing the positive electrode active material, binder resin, and water, and the paste is applied on the surface of the metal positive current collector (e.g., aluminum foil) and then dried or the like. However, when the positive electrode is produced in this manner, there is a possibility that the positive current collector corrodes and the current collecting property greatly deteriorates. In addition, since the Li ions are eluted from the positive electrode active material, causing a decrease in capacity of positive electrode active material and collapse of the crystal structure of the positive electrode active material, the battery capacity and the output characteristics greatly deteriorate.

In the nonaqueous secondary battery of the invention, on the other hand, the surface of the positive electrode active material is coated with the lithium salt having the average thickness of 20 to 50 nm. Since the surface of the positive electrode active material is coated with the lithium salt having the average thickness of 20 nm or more, Li ions are prevented from being eluted from the positive electrode active material during production of the positive electrode as above. This makes it possible to prevent a decrease in capacity of positive electrode active material and collapse of the crystal structure of the positive electrode active material. In the positive electrode active material coated with the lithium salt, Li ions may be eluted from the lithium salt. However, an elution amount of Li ions can be reduced as compared with the case using the positive electrode active material uncoated with lithium salt. Accordingly, an increase in pH of the positive paste is restrained, thereby preventing corrosion of the positive current collector. The nonaqueous secondary battery of the invention is therefore provided as a nonaqueous secondary battery having a superior current collecting property.

On the other hand, if the thickness of the lithium salt coating the surface of the positive electrode active material is too thick, it interferes with desorption and insertion of Li ions from and to the positive electrode active material during use of the battery. Conversely, this may cause a decrease in battery capacity and output characteristics. In the nonaqueous secondary battery of the invention, on the other hand, the average thickness of the lithium salt coating the surface of the positive electrode active material is reduced to 50 nm or less. Thus, during the use of the battery, Li ions are allowed to appropriately desorb from and absorb to the positive electrode active material.

The above nonaqueous secondary battery of the invention can be provided as a nonaqueous secondary battery with large battery capacity and improved output characteristics.

Examples of the positive electrode active material made of lithium-metal complex oxide are lithium nickel composite oxide ($LiNi_{1-X-Y}Co_XAl_YO_2$ and others) and lithium cobalt composite oxide.

The present inventors researched the thicknesses of coatings or films of lithium carbonate formed on the surfaces of the positive electrode active materials disclosed in Patent Literatures 1 and 2 and confirmed that all of them were less than 20 nm.

In the above nonaqueous secondary battery, preferably, the positive electrode active material includes a spherical or oval-spherical secondary particle made of primary particles flocculated or sintered, and the secondary particle has a surface coated with the lithium salt having the average thickness of 20 to 50 nm.

The nonaqueous secondary battery of the invention includes, as the positive electrode active material, a positive electrode active material made of spherical or oval-spherical secondary particle obtained by flocculation or sintering of primary particles. This positive electrode active material can improve the output characteristics and the battery capacity.

In the nonaqueous secondary battery of the invention, furthermore, the surface of the secondary particle is coated with the lithium salt having the average thickness of 20 to 50 nm. Thus, even when the positive electrode is produced as above, Li ions are prevented from being eluted from the positive electrode active material. This makes it possible to prevent a decrease in capacity of the positive electrode active material and collapse of crystal structure of the positive electrode active material.

As above, the nonaqueous secondary battery of the invention is provided as a secondary battery with large capacity and excellent output characteristics.

In one of the above nonaqueous secondary batteries, preferably, the lithium salt is at least one of lithium carbonate and lithium sulfate.

In the nonaqueous secondary battery of the invention, the surface of the positive electrode active material is coated with at least one of lithium carbonate and lithium sulfate. Accordingly, even when the positive electrode is produced as above, Li ions are prevented from being eluted from the positive electrode active material. Thus, the nonaqueous secondary battery can be provided capable of appropriately preventing corrosion of the positive current collector and collapse of the crystal structure of the positive electrode active material.

In one of the above nonaqueous secondary batteries, preferably, the positive current collector is made of aluminum.

When the positive electrode active material made of lithium-metal complex oxide is used, it is preferable in view of electrochemical safety to use a positive current collector made of aluminum (aluminium). If the positive current collector made of aluminum is used for production of the positive electrode, however, the corrosion reaction between alkali (LiOH) in the positive paste and the aluminum causes the generation of insulating $Al(OH)_3$ and, as the reaction advances, highly insulating $Al_2O_3$ is apt to be generated. This would greatly decrease electron conductivity of the positive electrode and hence decrease the battery output characteristics.

In the nonaqueous secondary battery of the invention, on the other hand, as described above, the surface of the positive electrode active material is coated with the lithium salt having the average thickness of 20 to 50 nm. Even when the positive electrode is produced as above, accordingly, Li ions are prevented from being eluted from the positive electrode active material. Thus, the nonaqueous secondary battery can prevent corrosion of the positive current collector made of aluminum and also can avoid generation of insulating $Al(OH)_3$ and $Al_2O_3$.

The nonaqueous secondary battery of the invention can be provided with the positive electrode having good electron conductivity and with excellent battery output characteristics.

Another aspect of the invention provides a coated positive electrode active material wherein a positive electrode active material made of lithium-metal complex oxide has a surface coated with a coating of lithium salt having an average thickness of 20 to 50 nm.

The use of the coated positive electrode active material of the invention for production of a positive electrode can prevent corrosion of a positive current collector as above and also enables appropriate desorption/insertion of Li ions from/into the positive electrode active material during use of the battery. The use of this coated positive electrode active material makes it possible to provide a nonaqueous secondary battery with large capacity and excellent output characteristics.

Furthermore, the above coated positive electrode active material is preferably configured such that the positive electrode active material is made of a spherical or oval-spherical secondary particle obtained by flocculation or sintering of the primary particles and the surface of the secondary particle is coated with the lithium salt having the average thickness of 20 to 50 nm.

The positive electrode active material constituting the coated positive electrode active material is made of the spherical or oval-spherical secondary particle obtained by flocculation or sintering of the primary particles. The use of such coated positive electrode active material including the positive electrode active material can provide improved output characteristics and battery capacity. In this coated positive electrode active material, furthermore, the surface of the secondary particle is coated with the lithium salt having of the average thickness of 20 to 50 nm. Accordingly, while the positive electrode is produced as above, Li ions are prevented from being eluted from the positive electrode active material. This can prevent a decrease in capacity of the positive electrode active material and collapse of the crystal structure of the positive electrode active material.

Consequently, with the use of this coated positive electrode active material, the nonaqueous secondary battery can be provided with large capacity and excellent output characteristics.

Another aspect of the invention provides a positive electrode for nonaqueous secondary battery, the positive electrode comprising: the aforementioned coated positive electrode active material; and a positive current collector made of metal.

The positive electrode for nonaqueous secondary battery of the invention includes the coated positive electrode active material in which the surface of the positive electrode active material made of lithium-metal complex oxide is coated with the coating of lithium salt having the average thickness 20 to 50 nm. Accordingly, as described above, it is possible to prevent corrosion of the positive current collector during production of the positive electrode and also appropriately enables desorption/insertion of Li ions from/into the positive electrode active material during use of the battery. The use of the positive electrode for nonaqueous secondary battery can provide the nonaqueous secondary battery with large capacity and excellent output characteristics.

Another aspect of the invention provides a method of producing a coated positive electrode active material in which a positive electrode active material made of lithium-metal complex oxide has a surface coated with a coating of lithium salt having an average thickness of 20 to 50 nm, the method comprising: a first firing step of firing a raw material for the positive electrode active material in an oxygen atmosphere; and a second firing step, following the first firing step, of firing the raw material in an oxygen atmosphere containing $CO_2$ gas at higher concentrations than in the first firing step.

According to the production method of the invention, the coated positive electrode active material in which the surface of the positive electrode active material made of lithium-metal complex oxide is coated with the coat of lithium salt (mostly, lithium carbonate) having the average thickness of 20 to 50 nm can be produced easily and appropriately.

In the production method of the invention, furthermore, the raw material for the positive electrode active material is fired or burned in an oxygen atmosphere in the first firing step, and then in the second firing step the raw material is fired in the oxygen atmosphere containing $CO_2$ gas at higher concentrations than in the first firing step. Consequently, the lithium-metal complex oxide can be more appropriately fired from beginning to end as compared with a technique of firing in an oxygen atmosphere containing $CO_2$ gas (disclosed in Patent Literature 1), and also the surface thereof can be reliably coated with the lithium salt.

In the above method of producing the coated positive electrode active material, preferably, the second firing step includes firing the raw material in an oxygen atmosphere with the $CO_2$ gas at concentrations of 300 to 400 ppm for 4 to 8 hours.

According to the production method of the invention, it is possible to more appropriately produce the coated positive electrode active material in which the surface of the positive electrode active material made of lithium-metal complex oxide is coated with the coating of lithium salt (mainly, lithium carbonate) having the average thickness of 20 to 50 nm.

Another aspect of the invention provides a method of producing a coated positive electrode active material in which a positive electrode active material made of lithium-metal complex oxide has a surface coated with a coating of lithium salt having an average thickness of 20 to 50 nm, the method comprising: exposing the positive electrode active material to an atmosphere of constant temperature and constant humidity containing $CO_2$ gas to form the coating of lithium salt on the surface of the positive electrode active material.

According to the production method of the invention, it is possible to easily and appropriately produce the coated positive electrode active material in which the surface of the positive electrode active material made of lithium-metal complex oxide is coated with the coating of lithium salt (mainly, lithium carbonate) having the average thickness of 20 to 50 nm.

Furthermore, in the production method of the invention, separately from the production (firing) of the positive electrode active material (i.e., after the production of the positive electrode active material), the positive electrode active material is exposed to the atmosphere of constant temperature and constant humidity containing $CO_2$ gas to form the coating of lithium salt on the surface of the positive electrode active material. Consequently, the lithium-metal complex oxide can be more appropriately fired from beginning to end as compared with the technique of firing in the oxygen atmosphere containing $CO_2$ gas (disclosed in Patent Literature 1), and also the surface thereof can be reliably coated with the lithium salt.

In the above method of producing the coated positive electrode active material, preferably, the positive electrode active material is exposed for 8 to 24 hours to the atmosphere of constant temperature and constant humidity with a $CO_2$ gas concentration of 300 to 400 ppm, a temperature of 30 to 80° C., and a relative humidity of 40 to 100% RH.

According to the production method of the invention, it is possible to more appropriately produce the coated positive electrode active material in which the surface of the positive electrode active material made of lithium-metal complex oxide is coated with the coating of lithium salt (mainly, lithium carbonate) having the average thickness of 20 to 50 nm.

Another aspect of the invention provides a method of producing a positive electrode for nonaqueous secondary battery, comprising: an application step of applying a positive paste on a positive current collector made of metal, the positive paste being prepared by mixing at least binder resin, water, and a coated positive electrode active material in which a positive electrode active material made of lithium-metal complex oxide has a surface coated with a coating of lithium salt having an average thickness of 20 to 50 nm.

As the positive paste to be applied to the positive current collector, the production method of the invention uses the positive paste prepared by mixing at least the binder resin, water, and the coated positive electrode active material in which the surface of the positive electrode active material made of lithium-metal complex oxide is coated with the coating of lithium salt having the average thickness of 20 to 50 nm. The positive paste containing the positive electrode active material coated with the lithium salt having the average thickness of 20 nm or more as above can prevent Li ions from being eluted from the positive electrode active material, thus restraining an increase in pH. Therefore, the use of this positive paste in the application step makes it possible to prevent corrosion of the positive current collector due to the positive paste. Consequently, this method can produce a positive electrode for nonaqueous secondary battery with a good current collecting property.

Since the corrosion reaction (consumption of alkali) is prevented, it is further possible to prevent elution of Li ions from the positive electrode active material to keep chemical equilibrium. Thus, the positive electrode for nonaqueous secondary battery with high capacity density can be produced capable of preventing a decrease in capacity of the positive electrode active material and collapse of crystal structure of the positive electrode active material.

On the other hand, if the thickness of the lithium salt coating the surface of the positive electrode active material is too thick, it interferes with desorption/insertion of Li ions from/into the positive electrode active material during use of the nonaqueous secondary battery. This may decrease the battery capacity and output characteristics. In the production method of the invention, to the contrary, the coated positive electrode active material in which the lithium salt coating the surface of the positive electrode active material is reduced to 50 nm or less is used. Accordingly, it is possible to produce the positive electrode for nonaqueous secondary battery enabling appropriate desorption/insertion of Li ions from/into the positive electrode active material during use of the nonaqueous secondary battery.

In the above method of producing the electrode for nonaqueous secondary battery, preferably, the coated positive electrode active material is a coated positive electrode active material produced by one of the aforementioned coated positive electrode active material producing methods, the positive electrode active material having a surface coated with a coating of lithium salt having an average thickness of 20 to 50 nm.

In the production method of the invention, the positive electrode for nonaqueous secondary battery is produced in such a manner that the raw material for the positive electrode active material is fired in the oxygen atmosphere and consecutively fired in the oxygen atmosphere with $CO_2$ gas at higher concentrations. Alternatively, the positive electrode for nonaqueous secondary battery is produced of the positive electrode active material made in such a manner that the positive electrode active material is exposed to the atmosphere of constant temperature and constant humidity containing $CO_2$ gas to coat the surface of the positive electrode active material with the coating of lithium salt.

The thus produced coated positive electrode active material is a coated positive electrode active material obtained by more appropriately firing the lithium-metal complex oxide from beginning to end as compared with the positive electrode active material made by firing in the oxygen atmosphere containing $CO_2$ gas as mentioned above (the technique disclosed in Patent Literature 1). According to the production method of the invention, consequently, the positive electrode for nonaqueous secondary battery with high capacity density and excellent output characteristics can be produced.

Another aspect of the invention provides a method of producing a nonaqueous secondary battery including a positive electrode for nonaqueous secondary battery, wherein the positive electrode for nonaqueous secondary battery is a positive electrode for nonaqueous secondary battery produced by one of the aforementioned producing methods of positive electrode for nonaqueous secondary battery.

In the production method of the invention, the nonaqueous secondary battery is produced by use of the positive electrode for nonaqueous secondary battery in which the positive paste is applied on the positive current collector made of metal, the positive paste being made by mixing at least the binder resin, water, and the coated positive electrode active material in which the surface of the positive electrode active material made of lithium-metal complex oxide is coated with the coating of lithium salt having the average thickness of 20 to 50 nm. The thus produced positive electrode for nonaqueous secondary battery is a positive electrode for nonaqueous secondary battery with an excellent current collecting property and high capacity density as described above.

According to the production method of the invention, the nonaqueous secondary battery with high capacity and excellent output characteristics can be produced.

REFERENCE SIGNS LIST

Figure 1:
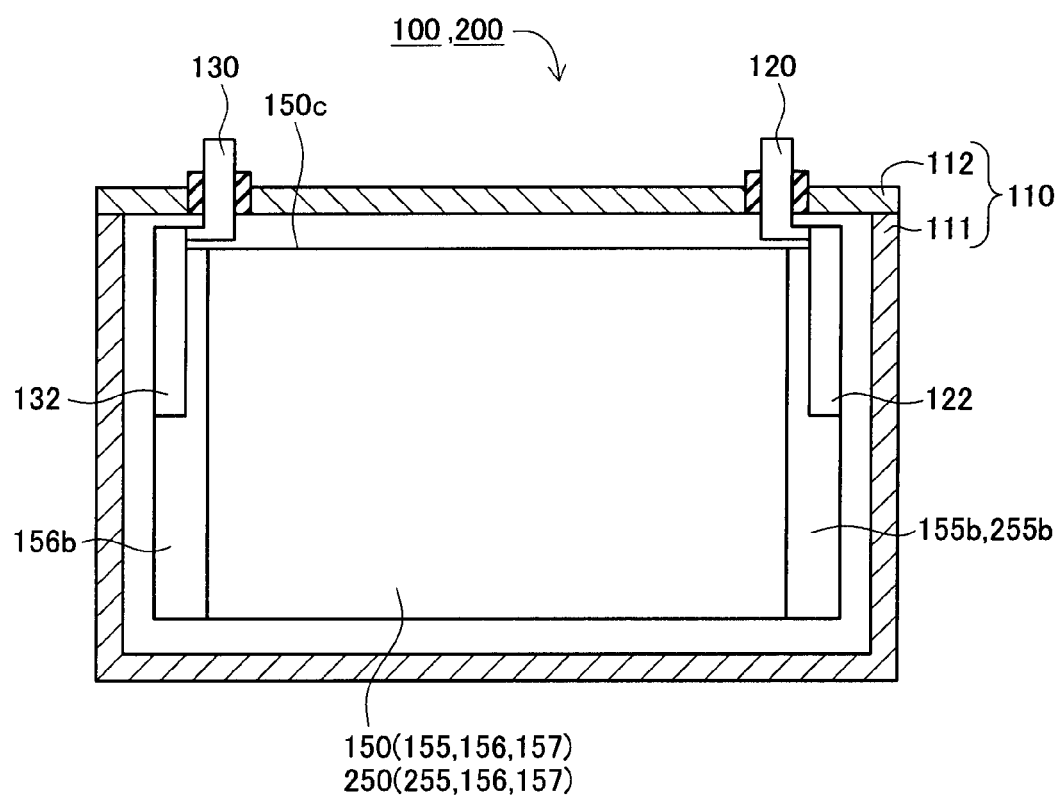
FIG. 1 is a cross sectional view of a nonaqueous secondary battery in an example.

100, 200 Nonaqueous secondary battery
151 Positive current collector
153 Positive active material (Secondary particle)
153*b* Primary particle
154, 254 Coated positive electrode active material
155, 255 Positive electrode (Positive electrode for nonaqueous secondary battery)
158, 258 Lithium salt

DESCRIPTION OF EMBODIMENTS

A detailed description of preferred embodiments of the present invention will now be given referring to the accompanying drawings.

Example 1

A nonaqueous secondary battery 100 in this example 1 will be explained first. The nonaqueous secondary battery 100 is a rectangular sealed lithium ion secondary battery including a rectangular-parallelepiped battery case 110, a positive terminal 120, and a negative terminal 130.

The battery case 110 is made of metal and includes a rectangular housing part 111 defining a rectangular-parallelepiped housing space and a metal lid part 112. In the battery case 110 (the rectangular housing part 111), there are stored a wound body 150, a positive electrode connecting member 122, a negative electrode connecting member 132, and others. The positive electrode connecting member 122 and the negative electrode connecting member 132 are made of a metal member formed in a long narrow plate-like shape and connected to the positive terminal 120 and the negative terminal 130 respectively.

The wound body 150 is a flat-shaped wound body being elliptic in section made by winding sheet-like positive electrode 155, negative electrode 156, and separator 157. This wound body 150 includes a positive electrode wound part 155*b* located at one end (a right end in FIG. 1) in an axis direction of the wound body 150 (a lateral direction in FIG. 1) and formed in a spiral form of only a part of the positive electrode 155 and a negative electrode wound part 156*b* located at the other end (a left end in FIG. 1) and formed in a spiral form of only a part of the negative electrode 156. The positive electrode 155 is coated, on a portion excepting the positive electrode wound part 155b, with a positive electrode mixture including a positive electrode active material. Similarly, the negative electrode 156 is coated, on a portion excepting the negative electrode wound part 156b, with a negative electrode mixture including a negative electrode active material.

Figure 2:
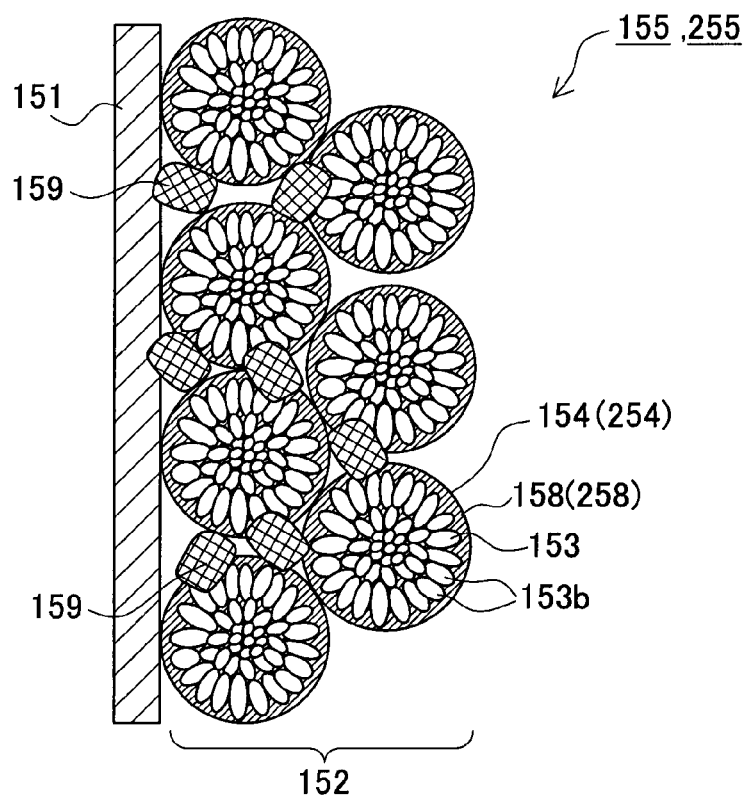
FIG. 2 is an enlarged sectional view of a positive electrode of the nonaqueous secondary battery.

Here, the details of the positive electrode 155 will be explained referring to FIG. 2. The positive electrode 155 includes, as shown in FIG. 2, a positive current collector 151 made of aluminum foil and a positive electrode mixture 152 coating the surface of the positive current collector 151. The positive electrode mixture 152 includes coated positive electrode active materials 154, conductive materials 159 (in example 1, acetylene black, ketchen black, etc.) and binder resin not shown (in example 1, CMC, PTFE, etc.).

Figure 3:
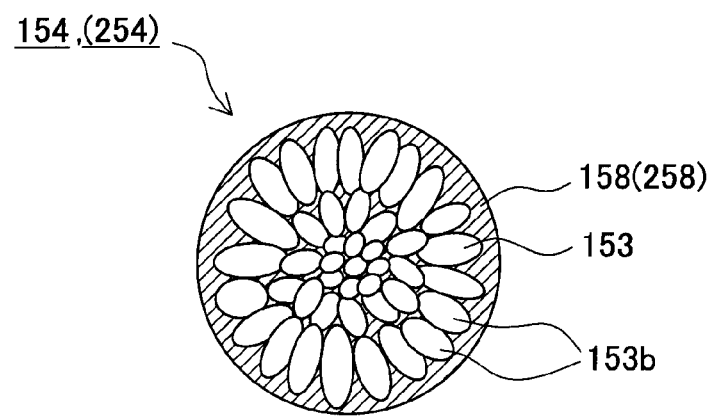
FIG. 3 is an enlarged sectional view of a coated positive electrode active material.

Of the above, each coated positive electrode active material 154 includes, as shown in FIG. 3, a positive electrode active material 153 as a spherical secondary particle made of a number of primary particles 153b sintered and lithium salt 158 (indicated by hatching in FIG. 3) coating the surface of the positive electrode active material 153.

In the coated positive electrode active material 154 in example 1, the lithium salt 158 coating the surface of the positive electrode active material 153 (the secondary particle) has an average thickness of 50 nm. The lithium salt 158 also exists in gaps between the primary particles 153b as indicated by the hatching in FIG. 3. The lithium salt 158 is constituted of lithium carbonate (primary constituent) and lithium sulfate (accessory constituent). Furthermore, the positive electrode active material 153 is constituted of lithium nickel composite oxide ($LiNi_{1-X-Y}Co_XAl_YO_2$).

A method of producing the nonaqueous secondary battery 100 in example 1 will be explained below.

(Production of Coated Positive Electrode Active Material)

Figure 4:
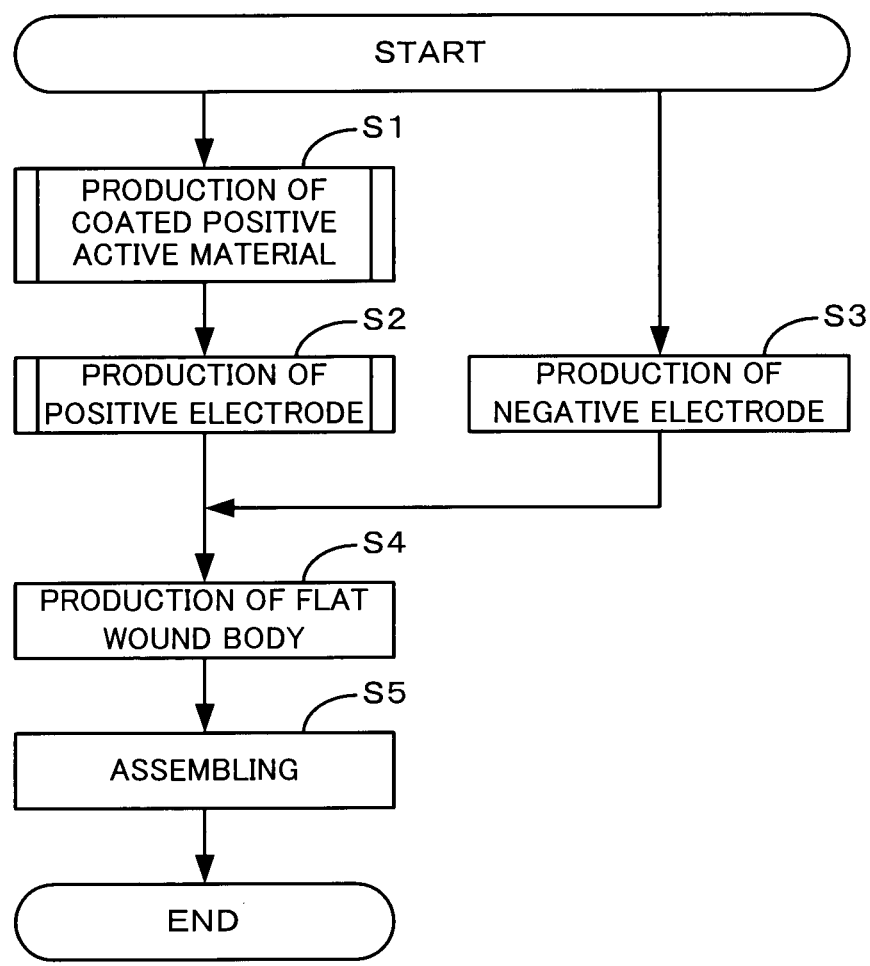
FIG. 4 is a flowchart showing a flow for producing the nonaqueous secondary battery.

In step S1, firstly, the coated positive electrode active material 154 is produced as shown in FIG. 4.

Figure 5:
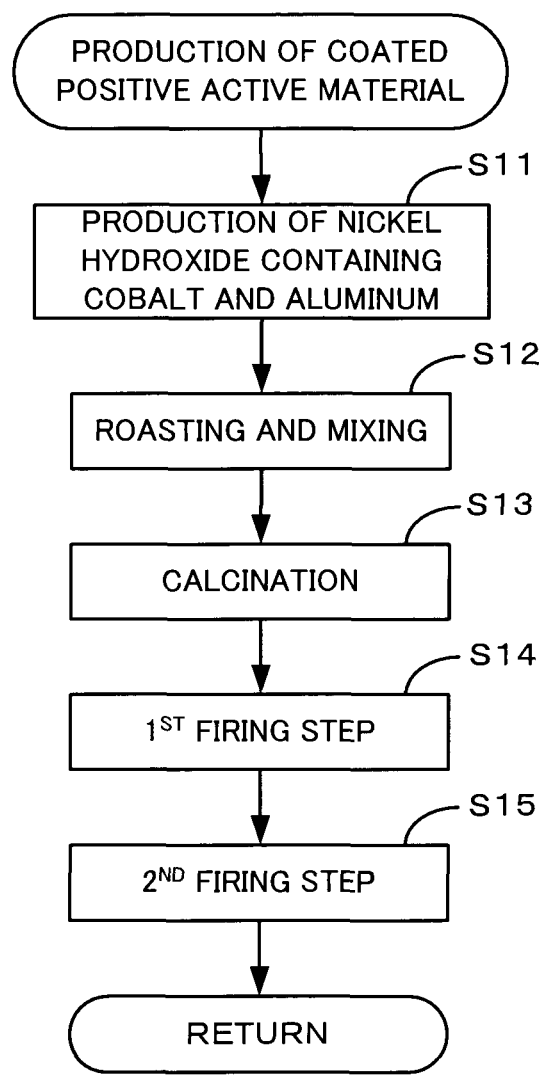
FIG. 5 is a flowchart showing a flow for producing the coated positive electrode active material.

To be concrete, as shown in FIG. 5, in step S11, nickel hydroxide containing cobalt and aluminum made of the spherical secondary particles each including the primary particles flocculated is produced by a well-known reaction crystallization method (see e.g., JP 2006-127955 A). In step S12, successively, the nickel hydroxide containing cobalt and aluminum is roasted at about 1000° C. into an oxide, and then this oxide is mixed with lithium hydroxide-hydrate. In step S13, this mixture is placed in an electric furnace and calcined in an oxygen atmosphere at about 500° C. for about 3 hours.

Subsequently, in step S14 (a first firing step), the mixture is fired in an oxygen atmosphere at about 730° C. for about 12 to 20 hours. In step S15, $CO_2$ gas is supplied into the electric furnace without decreasing the temperature in the electric furnace, and the mixture is fired in an oxygen atmosphere at a $CO_2$ gas concentration of about 300 to 400 ppm for 8 hours. A disintegrating treatment is then conducted to produce a number of spherical fine particles.

When the cross section of the produced spherical fine particle (see FIG. 3) is observed through a transmission electron microscope (TEM), it is confirmed that the fine particle is the coated positive electrode active material 154 constituted of the positive electrode active material 153 including a number of the primary particles 153b made of lithium nickel composite oxide and sintered together and the lithium salt 158 (indicated by the hatching in FIG. 3) coating the surface of the positive electrode active material 153 (the secondary particle). Furthermore, when the thickness of the lithium salt 158 coating the surface of the positive electrode active material 153 (the secondary particle) is investigated, its average thickness is 50 nm.

It is also confirmed that the lithium salt 158 contains lithium carbonate and lithium sulfate. It is conceivable that the lithium carbonate is produced in step 15 (the first firing step) by reaction of the $CO_2$ gas supplied into the electric furnace and lithium in the positive electrode active material. It is further conceivable that the lithium sulfate is produced in step S14 (the first firing step) and step 15 (the second firing step) by reaction of sulfate ion and lithium present in the positive electrode active material.

(Production of Positive Electrode)

In step S2, subsequently, the positive electrode 155 is produced as shown in FIG. 4.

Figure 6:
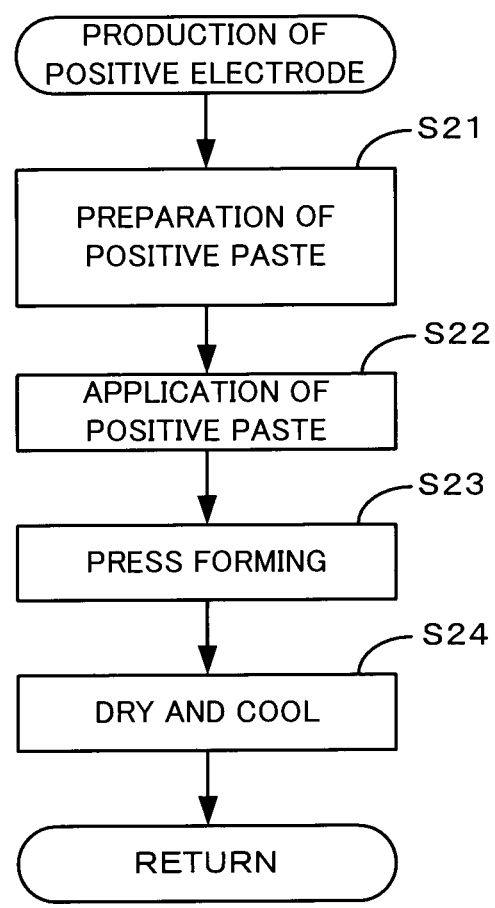
FIG. 6 is a flowchart showing a flow for producing the positive electrode.

To be concrete, in step S21 (a positive paste preparation step), as shown in FIG. 6, a positive paste is prepared by mixing the coated positive electrode active material 154 obtained as above, the conductive material 159 (acetylene black, ketchen black), water-based binder resin (CMC, PTFE), and water.

In step S22 (the application step), then, this positive paste is applied on the surface of the positive current collector 151 (aluminum foil). In step S23, the positive current collector 151 applied with the paste is subjected to a press work to press it into a positive electrode sheet. Subsequently, in step S24, this positive electrode sheet is dried under vacuum at 120° C. for 8 hours and then cooled, producing the positive electrode 155.

Meanwhile, in example 1, the positive paste is prepared by use of the coated positive electrode active materials 154 in each of which the surface of the positive electrode active material 153 (the secondary particle) is coated with the lithium salt 158 having the average thickness of 50 nm (see FIG. 3). As above, the positive paste using the positive electrode active materials 153 each coated with the lithium salt 158 having the average thickness of 20 nm or more can prevent Li ions from being eluted from the positive electrode active material 153, thereby restraining an increase in its pH. The use of this positive paste in the application step enables to prevent corrosion of the positive current collector 151 by the positive paste. Thus, the positive electrode 155 can provide an excellent current collecting property. Since the corrosion reaction (consumption of alkali) is prevented, it is possible to prevent elution of Li ions from the positive electrode active material to keep chemical equilibrium. This can restrain the decrease in capacity of the positive electrode active material 153 and the collapse of crystal structure of the positive electrode active material 153.

(Production of Battery)

As shown in FIG. 4, in step S3, a paste prepared by mixing a negative electrode active material (carbon powder) and binder resin is applied on the surface of a negative electrode base material (copper foil), and this base material is subjected to a press work to form the negative electrode 156.

In step S4, the positive electrode 155, the negative electrode 156, and the separator 157 are laminated and wound to form the flat wound body 150 being elliptic in section.

In step S5, assembling of the nonaqueous secondary battery 100 is performed. Specifically, the flat wound body 150 is connected to external terminals (the positive terminal 120 and the negative terminal 130) and also housed in the rectangular housing part 111. Then, the rectangular housing part 111 and the lid part 112 are welded to seal the battery case 110 (see FIG. 1). An electrolyte is poured through a liquid inlet (not shown) provided in the lid member 112 and then the liquid inlet is sealed. Thus, the nonaqueous secondary battery 100 in example 1 is completed.

Example 2

In example 2, different from example 1, the firing time in step S15 (the second firing step) is set at 4 hours in an oxygen atmosphere at a $CO_2$ gas concentration of about 300 to 400 ppm. In this way, as shown in FIG. 3, a coated positive electrode active material 254 is produced in which the surface of a positive electrode active material 153 (a secondary particle) is coated with lithium salt 258 having an average thickness of 20 nm. By use of this coated positive electrode active material 254, a nonaqueous secondary battery 200 is produced as with example 1 under the same conditions as those in example 1.

As comparative examples, five positive electrodes having different average thicknesses of lithium salt coating the surface of each positive electrode active material 153 were produced of coated positive electrode active materials having average thicknesses of 0, 5, 80, 100, and 120 nm coating the surfaces of the positive electrode active materials 153 (secondary particles). By use of those positive electrodes, five kinds of nonaqueous secondary batteries (referred to as Comparative examples 1 to 5 in ascending order of average thickness of lithium salt) were produced.

(Evaluation of Batteries)

Outputs of the nonaqueous secondary batteries 100 and 200 in examples 1 and 2 and the nonaqueous secondary batteries in comparative examples 1 to 5 were measured respectively.

To be specific, each nonaqueous secondary battery was charged into a full charged state and then respective outputs (watt) were measured per 10 seconds during discharge. Assuming that the output of the nonaqueous secondary battery (the lithium salt coating the surface of the positive electrode active material has an average thickness of 5 nm) in comparative example 2 is a reference output (100%), an output ratio (%) of each nonaqueous secondary battery was calculated.

The output ratios in the nonaqueous secondary batteries 100 and 200 in examples 1 and 2 were 118% and 112% respectively. In comparative examples 1, 3 to 5, the output ratios were 90%, 114%, 105%, and 95% respectively. A graph created based on those output ratios is shown in FIG. 7.

Figure 7:
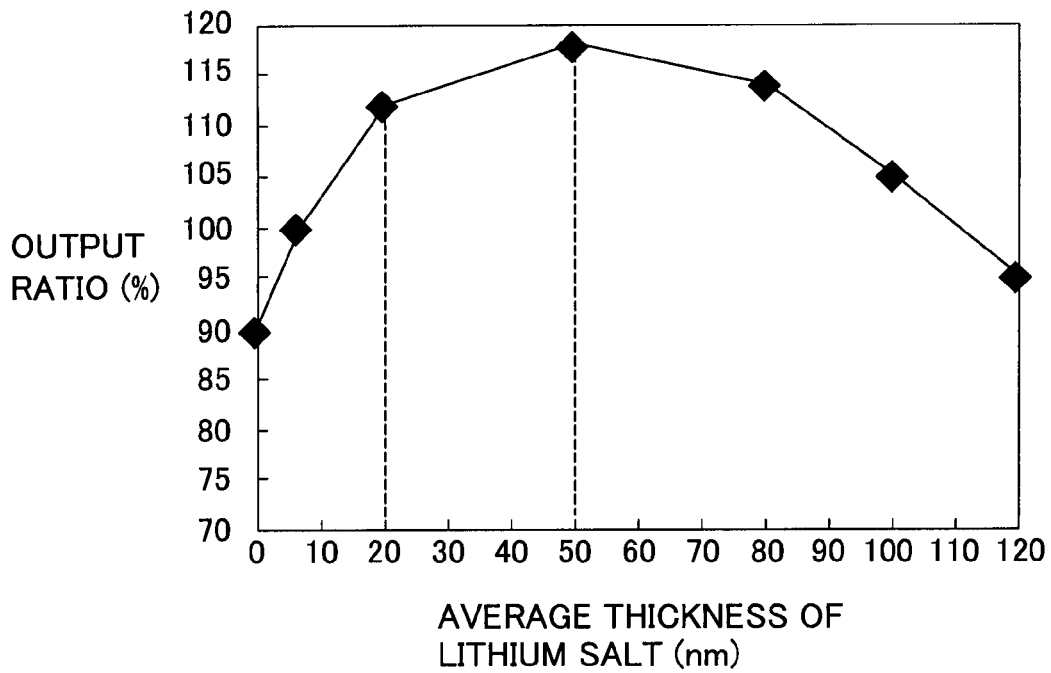
FIG. 7 is a graph showing a relationship between average thickness of lithium salt and output ratio.

As shown in FIG. 7, it is proved that the nonaqueous secondary batteries (in examples 1 and 2 and the comparative example 3) produced such that the average thickness of lithium salt coating the surface of the positive electrode active material was 20 to 80 nm could provide excellent output characteristics.

On the other hand, the nonaqueous secondary batteries (in comparative examples 1 and 2) produced such that the average thickness of lithium salt coating the surface of the positive electrode active material was less than 20 nm were inferior in output characteristics to the nonaqueous secondary batteries (in examples 1 and 2 and comparative example 3) produced such that the average thickness of lithium salt coating the lithium salt was 20 to 80 nm. This is conceivable that during production of the positive electrode (in step S2) a large amount of Li ions are eluted from the positive electrode active material (the lithium nickel composite oxide) because of a thin coat or layer of lithium salt, and the positive paste becomes strong alkali, thereby advancing the corrosion of the positive current collector and greatly deteriorating the current collecting property of the positive electrode, resulting in the large deterioration of battery output characteristics.

The nonaqueous secondary batteries (comparative examples 4 and 5) produced such that the average thickness of lithium salt coating the surface of the positive electrode active material was more than 80 nm were also greatly inferior in output characteristics to the nonaqueous secondary batteries (examples 1 and 2 and comparative example 3) produced such that the average thickness of the coating of lithium salt were 20 to 80 nm. This conceivably results from the following reasons.

When the lithium salt coating the surface of the positive electrode active material was made thick, it was possible to prevent corrosion of the positive current collector during production (in step S2) of the positive electrode. However, it is conceivable that when the coating of lithium salt is too thick, it interferes with desorption/insertion of Li ions from/into the positive electrode active material (lithium nickel composite oxide) during use of the battery, hence deteriorating the output characteristics.

Furthermore, the CCCV capacity was measured on each of the nonaqueous secondary batteries 100 and 200 in examples 1 and 2 and the nonaqueous secondary batteries in comparative examples 1 to 5.

Specifically, each nonaqueous secondary battery was subjected to predetermined initial charge and discharge, and then charged at constant current-constant voltage for 1.5 hours until the battery voltage reached 4.1 V. Thereafter, under a temperature environment of 25° C., each battery was discharged at a current value of ⅓C until the battery voltage was decreased to 3V. A discharge capacity of each nonaqueous secondary battery at that time was obtained as the CCCV capacity. Assuming that the CCCV capacity of the nonaqueous secondary battery in comparative example 2 (the lithium salt coating the surface of the positive electrode active material has an average thickness of 5 nm) is a reference capacity (100%), a CCCV capacity ratio (%) of each nonaqueous secondary battery was calculated.

Consequently, in the nonaqueous secondary batteries 100 and 200 in examples 1 and 2, respective CCCV capacity ratios were 104% and 105%. In comparative examples 1, 3 to 5, the output ratios were 95%, 95%, 87%, and 80% respectively. A graph created based on those CCCV capacity ratios is shown in FIG. 8.

Figure 8:
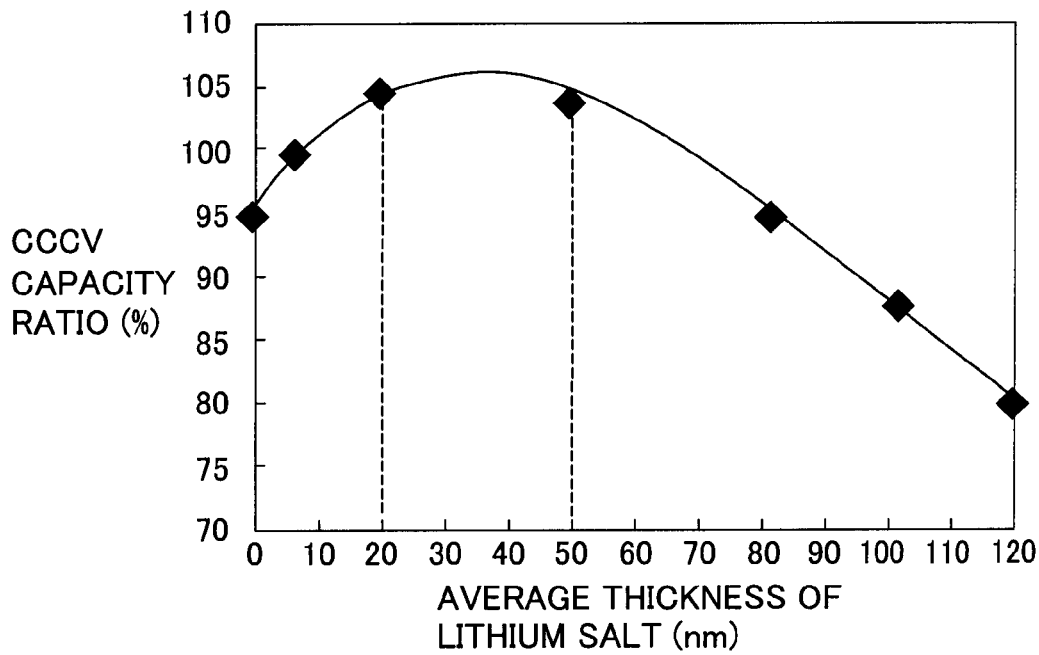
FIG. 8 is a graph showing a relationship between average thickness of lithium salt and CCCV capacity ratio.

As shown in FIG. 8, it is found that the nonaqueous secondary batteries (examples 1 and 2) produced such that the average thickness of lithium salt coating the surface of the positive electrode active material was 20 to 50 nm could provide a large battery capacity.

On the other hand, the nonaqueous secondary batteries (comparative examples 1 and 2) produced such that the average thickness of lithium salt coating the surface of the positive electrode active material was less than 20 nm could provide a smaller battery capacity than the nonaqueous secondary batteries (examples 1 and 2) produced such that the lithium salt coating had an average thickness of 20 to 50 nm. This is conceivable because a large amount of Li ions were eluted from the positive electrode active material (lithium nickel composite oxide) during production of the positive electrode (in step S2) as described above, thus decreasing the capacity of positive electrode active material and causing collapse of the crystal structure of the positive electrode active material, and hence the battery capacity and the output characteristics are greatly deteriorated.

The nonaqueous secondary batteries (comparative examples 3 to 5) produced such that the average thickness of lithium salt coating the surface of the positive electrode active material was more than 50 nm were also greatly inferior in battery capacity to the nonaqueous secondary batteries (examples 1 and 2) produced such that the lithium salt coating had an average thickness of 20 to 50 nm. This is conceivable because when the lithium salt coating is too thick, it interferes with desorption/insertion of Li ions with respect to the positive electrode active material during use of the battery as described above, causing the decrease in battery capacity.

As above, the use of the coated positive electrode active material in which the surface of the positive electrode active material is coated with the lithium salt having an average thickness of 20 to 50 nm can produce the nonaqueous secondary battery with high capacity and excellent output characteristics.

Third Embodiment

In examples 1 and 2, in step S15 (the second firing step), $CO_2$ gas is supplied into the electric furnace and the mixture is fired in an oxygen atmosphere at a $CO_2$ gas concentration of 300 to 400 ppm for 4 to 8 hours. Accordingly, as shown in FIG. 3, the positive electrode active materials 154 and 254 in which the surfaces of the positive electrode active materials 153 (secondary particles) are coated with the lithium salts 158 and 258 each having an average thickness of 20 to 50 nm are produced.

In example 3, on the other hand, the positive electrode active material in the oxygen atmosphere is completely fired in step S14 (the first firing step) and then, without being subjected to the process in step S15 (the second firing step), this positive electrode active material is subjected to an atmosphere of constant temperature and constant humidity, at a $CO_2$ gas concentration of 300 to 400 ppm, a temperature of 30 to 80° C., and relative humidity of 40 to 100%, for 8 to 24 hours. In this way, the coated positive electrode active materials 154 and 254 are obtained in which the surfaces of the positive electrode active materials 153 (secondary particles) are coated with the lithium salts 158 and 258 respectively, each having an average thickness of 20 to 50 nm.

The nonaqueous secondary battery in example 3 produced by using the thus produced coated positive electrode active materials 154 and 254 in similar manner to the examples 1 and 2 also can provide similar output characteristics and battery capacity to those of the nonaqueous secondary batteries in examples 1 and 2.

The present invention is explained above along examples 1 to 3 but not limited thereto. The present invention may be embodied in other specific forms without departing from the essential characteristics thereof.

The invention claimed is:

1. A method of producing a coated positive electrode active material in which a positive electrode active material made of lithium-metal complex oxide has a surface coated with a coating of lithium salt containing lithium carbonate and having an average thickness of 20 to 50 nm, the method comprising:
   a first firing step of firing a raw material for the positive electrode active material in a reaction system having an oxygen atmosphere; and
   a second firing step, following the first firing step, of supplying $CO_2$ gas into the reaction system having the oxygen atmosphere and firing the raw material in the reaction system having the oxygen atmosphere containing $CO_2$ at a higher concentration than in the first firing step,
   the second firing step including firing the raw material for 4 to 8 hours in an oxygen atmosphere at a $CO_2$ concentration of 300 to 400 ppm to form the coating of lithium salt having an average thickness of 20 to 50 nm on the surface of the positive electrode active material.

2. A method of producing a coated positive electrode active material in which a positive electrode active material made of lithium-metal complex oxide has a surface coated with a coating of lithium salt containing lithium carbonate and having an average thickness of 20 to 50 nm, the method comprising:
   exposing the positive electrode active material to an atmosphere of constant temperature and constant humidity with a $CO_2$ gas concentration of 300 to 400 ppm, a temperature of 30 to 80° C., and a relative humidity of 40 to 100% RH to form the coating of lithium salt having an average thickness of 20 to 50 nm on the surface of the positive electrode active material.

3. A method of producing a positive electrode for nonaqueous secondary battery, comprising:
   producing a coated positive electrode active material in which a positive electrode active material made of lithium-metal complex oxide has a surface coated with a coating of lithium salt containing lithium carbonate and having an average thickness of 20 to 50 nm, including:
   a first firing step of firing a raw material for the positive electrode active material in a reaction system having an oxygen atmosphere; and
   a second firing step, following the first firing step, of supplying $CO_2$ gas into the reaction system having the oxygen atmosphere and firing the raw material in the reaction system having the oxygen atmosphere containing $CO_2$ at a higher concentration than in the first firing step,
   the second firing step including firing the raw material for 4 to 8 hours in an oxygen atmosphere at a $CO_2$ concentration of 300 to 400 ppm to form the coating of lithium salt having an average thickness of 20 to 50 nm on the surface of the positive electrode active material; and
   applying a positive paste on a positive current collector made of metal, the positive paste being prepared by mixing at least binder resin, water, and the coated positive electrode active material.

4. A method of producing a nonaqueous secondary battery including a positive electrode for nonaqueous secondary battery, the method comprising:
   producing the positive electrode, including
   producing a coated positive electrode active material in which a positive electrode active material made of lithium-metal complex oxide has a surface coated with a coating of lithium salt containing lithium carbonate and having an average thickness of 20 to 50 nm, including:
   a first firing step of firing a raw material for the positive electrode active material in a reaction system having an oxygen atmosphere; and
   a second firing step, following the first firing step, of supplying $CO_2$ gas into the reaction system having the oxygen atmosphere and firing the raw material in the reaction system having the oxygen atmosphere containing $CO_2$ at a higher concentration than in the first firing step,
   the second firing step including firing the raw material for 4 to 8 hours in an oxygen atmosphere at a $CO_2$ concentration of 300 to 400 ppm to form the coating of lithium salt having an average thickness of 20 to 50 nm on the surface of the positive electrode active material; and
   applying a positive paste on a positive current collector made of metal, the positive paste being prepared by mixing at least binder resin, water, and the coated positive electrode active material; and
   producing a negative electrode.

5. A method of producing a positive electrode for nonaqueous secondary battery, comprising:
  producing a coated positive electrode active material in which a positive electrode active material made of lithium-metal complex oxide has a surface coated with a coating of lithium salt containing lithium carbonate and having an average thickness of 20 to 50 nm, including
  exposing the positive electrode active material to an atmosphere of constant temperature and constant humidity with a $CO_2$ gas concentration of 300 to 400 ppm, a temperature of 30 to 80° C., and a relative humidity of 40 to 100% RH to form the coating of lithium salt having an average thickness of 20 to 50 nm on the surface of the positive electrode active material; and
  applying a positive paste on a positive current collector made of metal, the positive paste being prepared by mixing at least binder resin, water, and the coated positive electrode active material.

6. A method of producing a nonaqueous secondary battery including a positive electrode for nonaqueous secondary battery, the method comprising:
  producing the positive electrode including
  producing a coated positive electrode active material in which a positive electrode active material made of lithium-metal complex oxide has a surface coated with a coating of lithium salt containing lithium carbonate and having an average thickness of 20 to 50 nm, including
    exposing the positive electrode active material to an atmosphere of constant temperature and constant humidity with a $CO_2$ gas concentration of 300 to 400 ppm, a temperature of 30 to 80° C., and a relative humidity of 40 to 100% RH to form the coating of lithium salt having an average thickness of 20 to 50 nm on the surface of the positive electrode active material; and
  applying a positive paste on a positive current collector made of metal, the positive paste being prepared by mixing at least binder resin, water, and the coated positive electrode active material; and
  producing a negative electrode.

\* \* \* \* \*